(12) United States Patent
Chen et al.

(10) Patent No.: US 8,801,050 B2
(45) Date of Patent: Aug. 12, 2014

(54) LOCKING DEVICE FOR CASE OF PORTABLE ELECTRONIC DEVICE

(75) Inventors: Jung-Pin Chen, Kaohsiung Hsien (TW); Shu-Chen Lin, Kaohsiung Hsien (TW); Shan-Yao Chen, Kaohsiung Hsien (TW)

(73) Assignee: King Slide Works Co., Ltd., Kaohsiung Hsien (TW)

( * ) Notice: Subject to any disclaimer, the term of this patent is extended or adjusted under 35 U.S.C. 154(b) by 632 days.

(21) Appl. No.: 13/043,759

(22) Filed: Mar. 9, 2011

(65) Prior Publication Data
US 2012/0230763 A1 Sep. 13, 2012

(51) Int. Cl.
*E05C 9/10* (2006.01)
*H04M 1/00* (2006.01)

(52) U.S. Cl.
USPC ...... 292/37; 292/41; 292/DIG. 11; 455/575.1

(58) Field of Classification Search
USPC .......... 292/1, 3, 8, 24–27, 30, 32–35, 37, 41, 292/300, 302, DIG. 7, DIG. 11, DIG. 63; 455/575.1, 575.8, 575.4, 90.3; 361/725–727, 731, 732, 754, 747, 361/801–803; 429/97, 123; 379/419, 379/428.01, 440
See application file for complete search history.

(56) References Cited

U.S. PATENT DOCUMENTS

| | | | |
|---|---|---|---|
| 2,889,609 A * | 6/1959 | Eisenhard et al. | 27/17 |
| 6,332,658 B1 * | 12/2001 | Sato et al. | 312/223.2 |
| 6,975,519 B2 * | 12/2005 | Siahpolo et al. | 361/798 |
| 7,272,011 B2 * | 9/2007 | Chen et al. | 361/726 |
| 7,414,853 B2 * | 8/2008 | Lee | 361/726 |
| 7,430,115 B2 * | 9/2008 | Liu et al. | 361/679.33 |
| 7,436,656 B2 * | 10/2008 | Jiang et al. | 361/679.55 |
| 7,495,898 B2 * | 2/2009 | Lo et al. | 361/679.55 |
| 7,751,181 B2 * | 7/2010 | Chen | 361/679.01 |
| 7,920,905 B2 * | 4/2011 | Bury | 455/575.1 |
| 7,986,524 B2 * | 7/2011 | Dong et al. | 361/679.55 |
| 8,164,885 B2 * | 4/2012 | Lu et al. | 361/679.01 |
| 8,164,898 B2 * | 4/2012 | Chen et al. | 361/679.55 |
| 8,179,684 B2 * | 5/2012 | Smrha et al. | 361/756 |
| 8,350,149 B2 * | 1/2013 | Chen et al. | 174/50 |
| 2003/0116973 A1 * | 6/2003 | Liu | 292/26 |
| 2007/0206348 A1 * | 9/2007 | Lin | 361/683 |
| 2008/0096617 A1 * | 4/2008 | Hwang et al. | 455/575.1 |
| 2013/0134721 A1 * | 5/2013 | Chen et al. | 292/213 |

* cited by examiner

*Primary Examiner* — Carlos Lugo
*Assistant Examiner* — Alyson M Merlino
(74) *Attorney, Agent, or Firm* — Rosenberg, Klein & Lee

(57) ABSTRACT

A securing device for a portable electronic device includes a body and a case is mounted to the body. First and second engaging members are respectively connected to two sides of the body. First and second locking members are respectively and movably connected to the two sides of the body and located corresponding to the first and second engaging members. The first locking member includes a first stop and a first recess, and the second locking member includes a second stop and a second recess. The first/second engaging member is stopped by the first/second stop and is movable in the first/second recess to unlock the secured status. A connection member is pivotably connected to the first and second locking members and is movable by operation of the control member to shift the first and second locking members to allow the first and second engaging members to unlock.

17 Claims, 7 Drawing Sheets

LOCKING DEVICE FOR CASE OF PORTABLE ELECTRONIC DEVICE

FIELD OF THE INVENTION

The present invention relates to a locking device, and more particularly, to a locking device for a replaceable case of a portable electronic device.

BACKGROUND OF THE INVENTION

The cellular phones, PDAs, GPSs, and electronic reading devices become necessary equipment for almost every person and the aesthetic outer appearance attracts the user's attentions directly by its color, texture and patterns. The outer appearance shows the personality of the user. However, the users cannot change the outer appearance of the electronic devices easily because the shape, the colors and the patterns are integral to the casing. Therefore, replaceable cases are developed to allow the users to change the casings as desired.

The applicant has filed a U.S. application Ser. No. 12/797,073 with the title of "housing assembly for electronic device" which is ready for examination.

The conventional case of the electronic lacks of locking feature to prevent the user from being operated improperly, or to prevent the case from being separated from the electronic device by impact such as dropping on the ground. Therefore, the present invention provides a locking device for securing the case to the electronic device.

The present invention intends to provide a locking device to securely connect the case to the electronic device.

SUMMARY OF THE INVENTION

The present invention relates to a securing device for a portable electronic device and comprises a body, a case, an engaging unit and a locking unit. The body has a first side and a second side which is located corresponding to the first side. The case is mounted to the body. The engaging unit has a first engaging member and a second engaging member, and the locking unit has a first locking member, a second locking member, a connection member and a control member. The first engaging member is connected to the first side of the body and the second engaging member is connected to the second side of the body. The first locking member is movably connected to the first side of the body and movable from a first initial position to a first unlocking position relative to the first engaging member. The first locking member has a first stop and a first recess, wherein the first stop is located corresponding to the first engaging member so that the first engaging member is stopped by the first stop when the first locking member is located at the first initial position. The second locking member is movably connected to the second side of the body and movable from a second initial position to a second unlocking position relative to the second engaging member. The second locking member has a second stop and a second recess, wherein the second stop is located corresponding to the second engaging member so that the second engaging member is stopped by the second stop when the second locking member is located at the second initial position. The connection member has a first end, a second end located corresponding to the first end, and a connection portion connected between the first and second ends. The first end and the second end are respectively pivotably connected to the first locking member and the second locking member. The control member is connected to the connection portion of the connection member. The control member is movable from a third initial position to a third unlocking position. The first engaging member is located corresponding to the first stop when the control member is located at the third initial position and the first locking member is located at the first initial position. The second engaging member is located corresponding to the second stop when the second locking member is located at the second initial position. The connection member is moved by the control member when the control member is moved to the third unlocking position, and the first recess of the first locking member is moved from the first initial position to the first unlocking position and located corresponding to the first engaging member. The second recess of the second locking member is moved from the second initial position to the second unlocking position and located corresponding to the second engaging member.

Preferably, the connection portion of the connection member has at least one slide member and the body has a slot which is located corresponding to the at least one slide member. The connection member moves linearly by moving the at least one slide member within the slot.

Preferably, the control member has a shaft portion and a guide slot. The body is pivotably connected to the shaft portion and the guide slot is located corresponding to the connection portion of the connection member. The connection portion has a pin engaged with the guide slot.

Preferably, the guide slot is shaped as an involute with a center at the shaft portion.

Preferably, the control member includes a stop member and the body has a restriction slot located corresponding to the stop member. The restriction slot is an annular slot with a center at the shaft portion.

Preferably, the body has a first part and a second part. The first part and the second part are matched to each other to accommodate the engaging unit and the locking unit therein. The engaging unit and the locking unit are composed of the first engaging member, the second engaging member, the first locking member, the second locking member, the connection member and the control member.

Preferably, an operation unit is connected to the body and includes an operation member, a first release member connected to the operation member, a second release member and a link. The link is pivotably connected to the body at a mediate portion thereof and two ends of the link are connected to the first and second release members. The first release member drives the first engaging member and the second release member drives the second engaging member. The operation member is pivotably connected to the body and has an arm which is connected to an end of the first release member where the link is connected to the end.

Preferably, the operation member has a pivot to which the body is pivotably connected and the arm has a connection hole. The first release member has a protrusion which extends through the connection hole.

The primary object of the present invention is to provide a securing device which ensures that the case is secured to the body of the electronic device.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
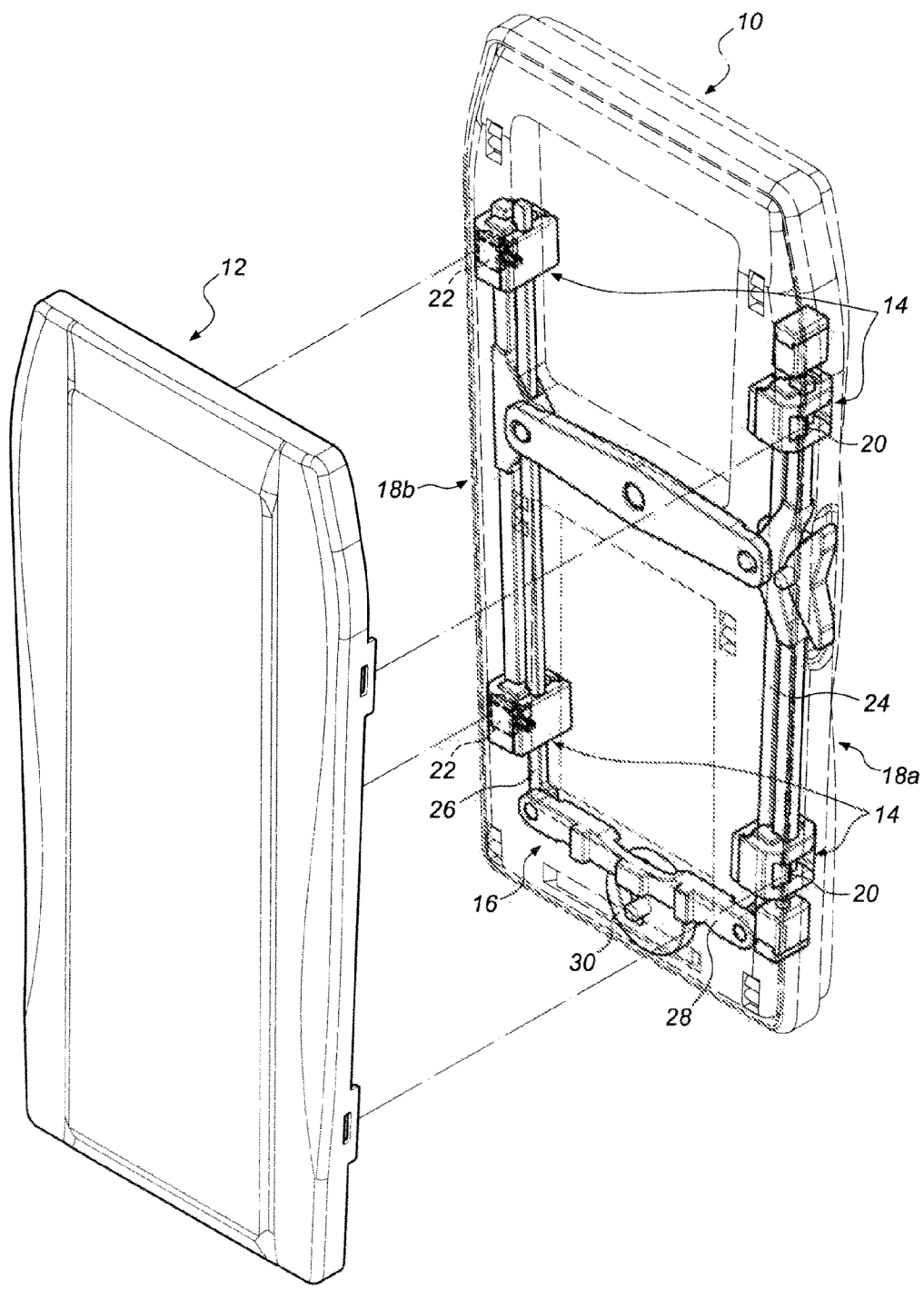
FIG. 1 is an exploded view to show the body and the case of the securing device of the present invention.
Figure 2:
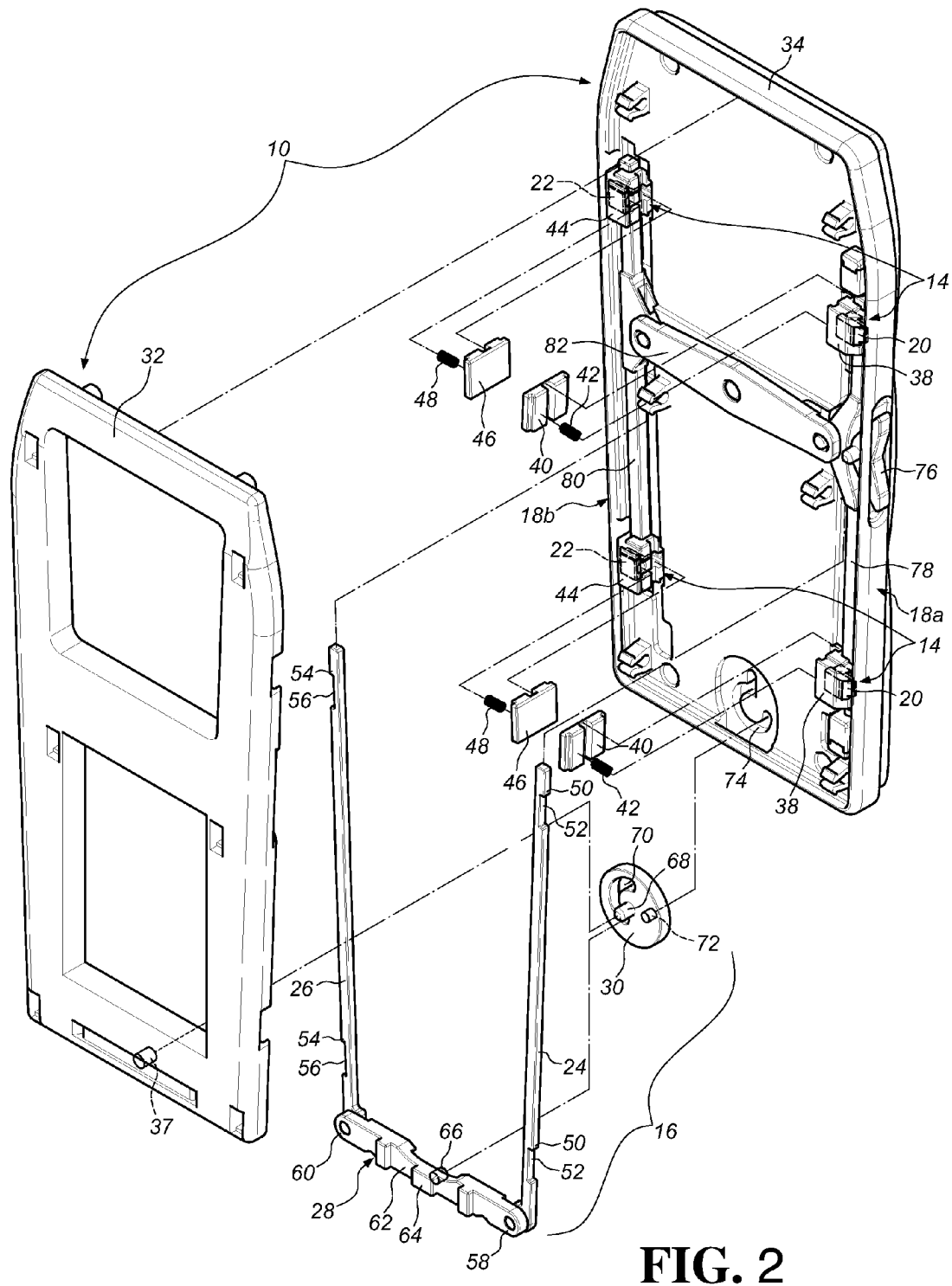
FIG. 2 is another exploded view to show the securing device of the present invention.

Referring to FIG. 1, the securing device of the present invention comprises a body 10, a case 12, an engaging unit 14 and a locking unit 16. The body 10 includes a first side 18a and a second side 18b which is located corresponding to the first side 18a. The case 12 is mounted to the body 10. The engaging unit 14 includes a first engaging member 20 and a second engaging member 22, and the locking unit 16 includes a first locking member 24, a second locking member 26, a connection member 28 and a control member 30 as shown in FIG. 2.

Figure 3:
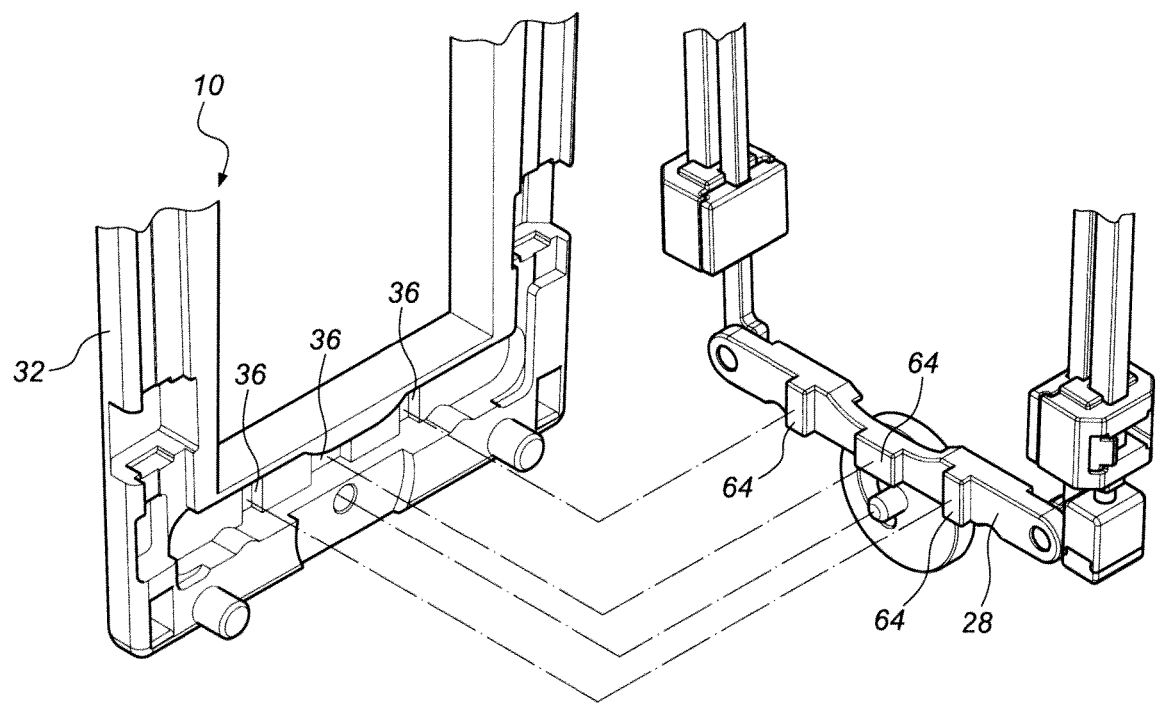
FIG. 3 is an exploded view to show the body and the connection member of the securing device of the present invention.

The body 10 includes a first part 32 and a second part 34, wherein the first part 32 and the second part 34 are matched to each other to accommodate the engaging unit 14 and the locking unit 16 therein. The engaging unit 14 and the locking unit 16 are composed of the first engaging member 20, the second engaging member 22, the first locking member 24, the second locking member 26, the connection member 28 and the control member 30. The body 10 further has a slot 36 and a pivot hole 37, the slot 36 is located corresponding to the connection member 28 and the control member 30 is pivotably connected to the pivot hole 37. The slot 36 can be defined in the first part 32 and can be plural as shown in FIG. 3.

The first engaging member 20 is received in a space defined by a first fixing part 38 and a first fixing member 40. The first engaging member 20 is connected to the first side 18a of the body 10 and biased by a first resilient member 42 to contact between the first engaging member 20 and the first fixing member 40. By the arrangement, the first engaging member 20 is applied a force to one side of the case 12. The number of the combination of the first engaging member 20, the first fixing part 38, the first fixing member 40 and the first resilient member 42 can be plural.

The second engaging member 22 is received in a space defined by a second fixing part 44 and a second fixing member 46. The second engaging member 22 is connected to the second side 18b of the body 10 and biased by a second resilient member 48 to contact between the second engaging member 22 and the second fixing member 46. By the arrangement, the second engaging member 22 is applied a force to the other side of the case 12. The number of the combination of the second engaging member 22, the second fixing part 44, the second fixing member 46 and the second resilient member 48 can be plural.

Figure 4:
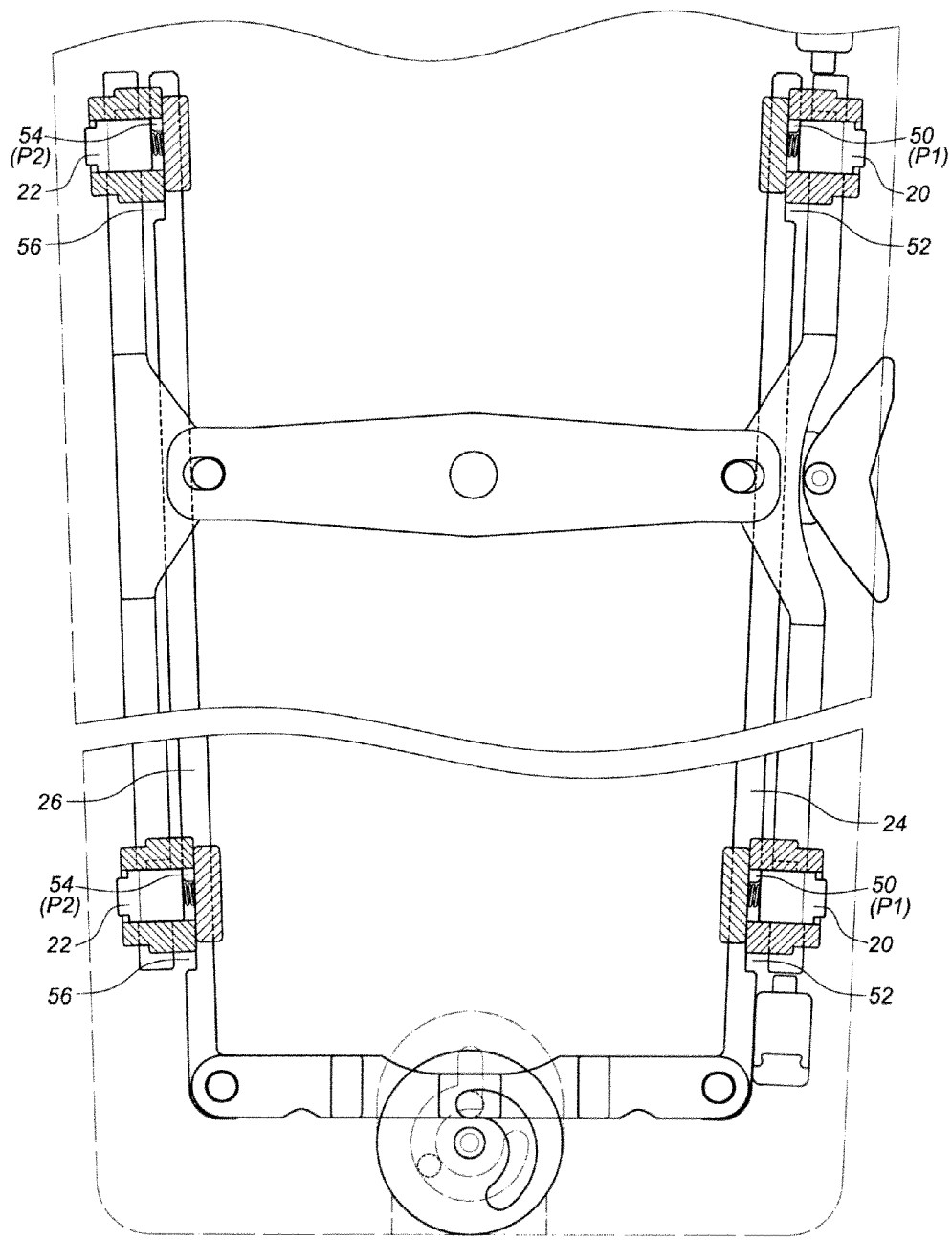
FIG. 4 shows the locked status of the securing device of the present invention.

The first locking member 24 is movably connected to the first side 18a of the body 10 and movable longitudinally from a first initial position P1 to a first unlocking position R1 (FIGS. 6 and 7) relative to the first engaging member 20. The first locking member 24 includes a first stop 50 and a first recess 52. As shown in FIG. 4, the first stop 50 is located corresponding to the first engaging member 20 so that the first engaging member 20 is stopped by the first stop 50 when the first locking member 24 is located at the first initial position P1. The number of the first stop 50 and the first recess 52 can be plural.

Figure 6:
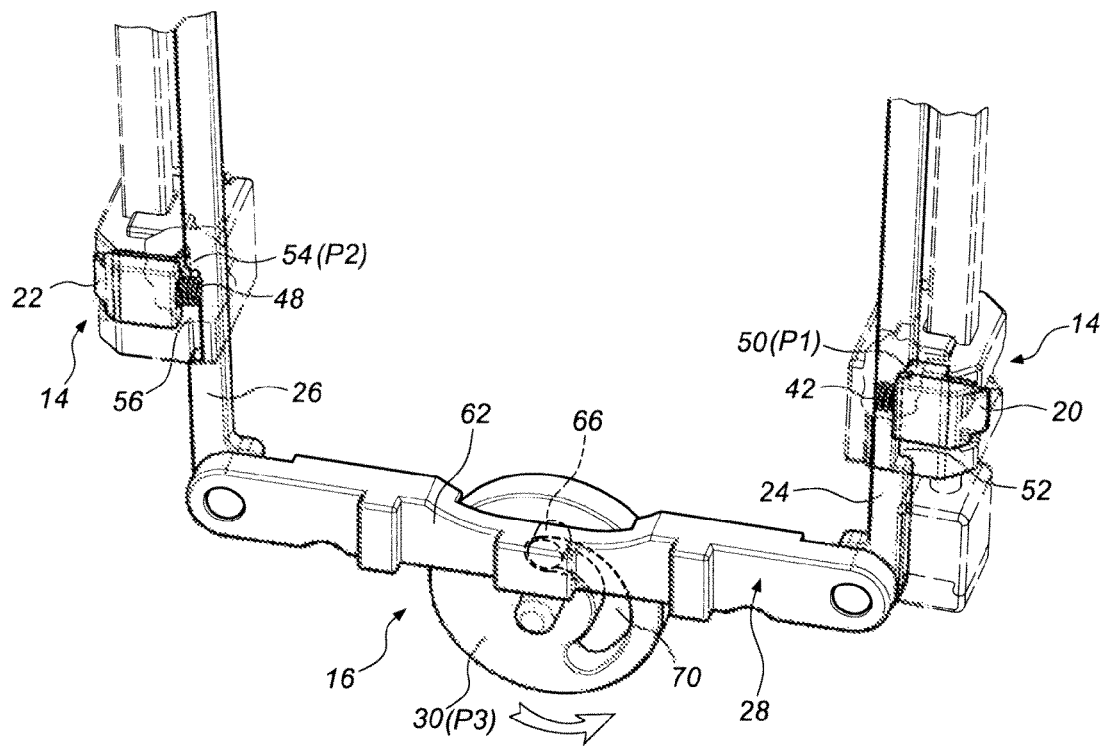
FIG. 6 shows that the engaging unit is locked by the locking unit.
Figure 7:
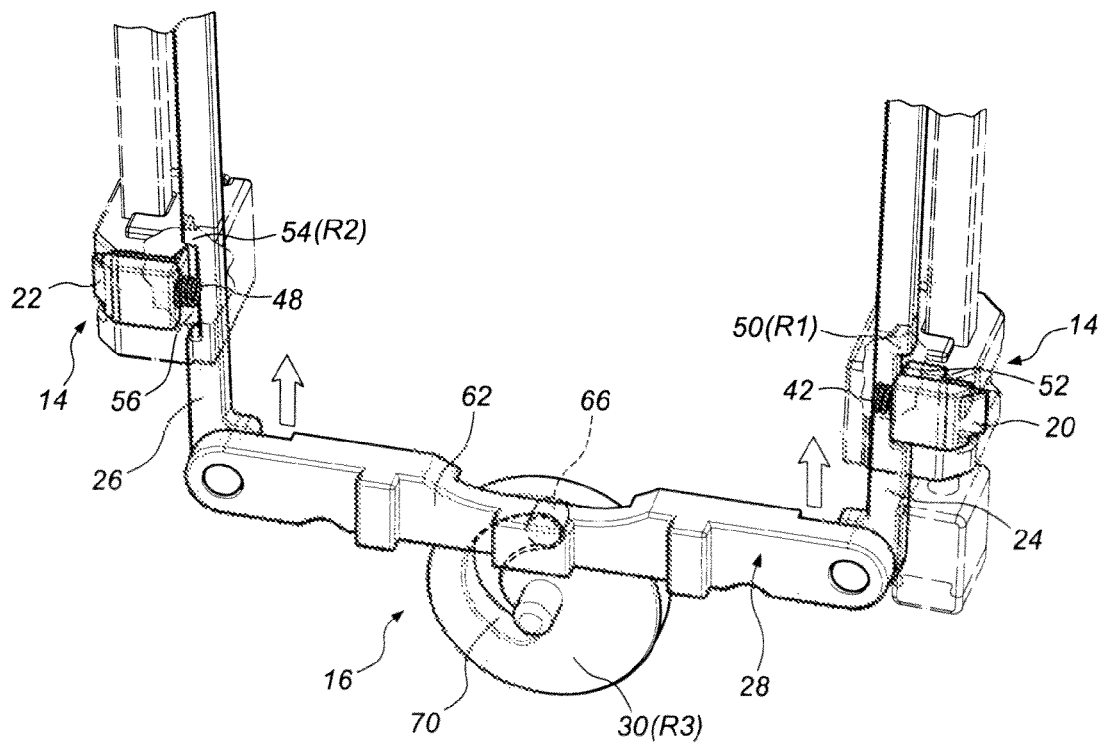
FIG. 7 shows that the locking unit is unlocked.

The second locking member 26 is movably connected to the second side 18b of the body 10 and movable longitudinally from a second initial position P2 to a second unlocking position R2 relative to the second engaging member 22 as shown in FIGS. 6 and 7. The second locking member 26 includes a second stop 54 and a second recess 56. As shown in FIG. 4, the second stop 54 is located corresponding to the second engaging member 22 so that the second engaging member 22 is stopped by the second stop 54 when the second locking member 26 is located at the second initial position P2. The number of the second stop 54 and the second recess 56 can be plural.

The connection member 28 includes a first end 58, a second end 60 located corresponding to the first end 58, and a connection portion 62 connected between the first and second ends 58, 60. The first end 58 and the second end 60 are respectively pivotably connected to the first locking member 24 and the second locking member 26. The connection portion 62 of the connection member 28 has at least one slide member 64 and the body 10 has a slot 36 (FIG. 3) which is located corresponding to the at least one slide member 64. The connection member 28 moves linearly by moving the at least one slide member 64 within the slot 36. The connection portion 62 has a pin 66.

The control member 30 is connected to the connection portion 62 of the connection member 28. As shown in FIGS. 6 and 7, the control member 30 is movable from a third initial position P3 to a third unlocking position R3. The first engaging member 20 is located corresponding to the first stop 50 when the control member 30 is located at the third initial position P3 and the first locking member 24 is located at the first initial position P1. The second engaging member 22 is located corresponding to the second stop 54 when the second locking member 26 is located at the second initial position P2. The control member 30 has a shaft portion 68 and a guide slot 70. The body 10 is pivotably connected to the shaft portion 68 by its pivot hole 37 and the guide slot 70 is located corresponding to the connection portion 62 of the connection member 28. The connection portion 62 has the pin 66 engaged with the guide slot 70. The guide slot 70 is shaped as an involute with a center at the shaft portion 68. Preferably, the control member 30 includes a stop member 72 and the body 10 has a restriction slot 74 located corresponding to the stop member 72. The restriction slot 74 is an annular slot with a center at the shaft portion 68. The restriction slot 74 can be defined in the second part 34 to restrict the angle of the rotation of the control member 30.

Figure 5:
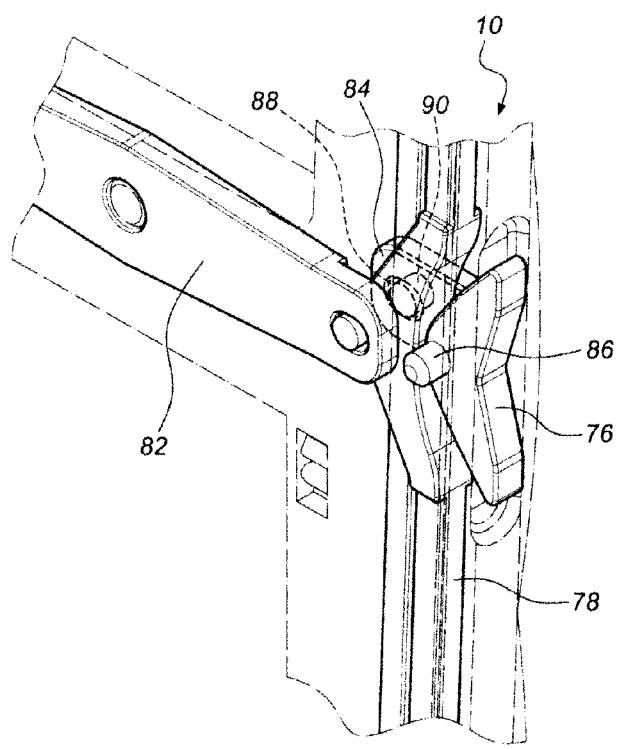
FIG. 5 shows the operation unit of the securing device of the present invention.

As shown in FIG. 2, the mechanism that allows the first and second engaging members 20, 22 to be movable is disclosed in U.S. patent application Ser. No. 12/797,073 and will not be described in detail. An operation unit is connected to the body 10 and includes an operation member 76, a first release member 78 connected to the operation member 76, a second release member 80 and a link 82 which is pivotably connected to the body 10 at a mediate portion thereof and two ends of the link 82 are connected to the first and second release members 78, 80. As shown in FIG. 5, the operation member 76 is pivotably connected to the body 10 and has an arm 84 which is connected to an end of the first release member 78 where the link 82 is connected to the end. Preferably, the operation member 76 includes a pivot 86 to which the body 10 is pivotably connected. The arm 84 has a connection hole 88 and the first release member 78 has a protrusion 90 which extends through the connection hole 88. By this arrangement, the operation member 76 is operated as a lever and the arm 84 drives the first release member 78 and the link 82.

As shown in FIGS. 6 and 7, when the control member 30 is rotated, the pin 66 of the connection member 28 is engaged with the guide slot 70 of the control member 30, so that when the control member 30 is moved to the third unlocking position R3, the connection member 28 is driven linearly by the control member 30, and the connection member 28 drives the first locking member 24 to disengage the first stop 50 of the first locking member 24 away from the first engaging member 20. The first recess 52 of the first locking member 24 is moved from the first initial position P1 to the first unlocking position R1 and located corresponding to the first engaging member 20. The first engaging member 20 is movable within the first recess 52. In the meanwhile, the second locking member 26 is moved by the connection member 28, and second stop 54 of the second locking member 26 is disengaged from the second engaging member 22. The second recess 56 of the second locking member 26 is moved from the second initial position P2 to the second unlocking position R2 and located corresponding to the second engaging member 22. The second engaging member 22 is movable in the second recess 56. Therefore, the first and second engaging members 20, 22 unlock the first and second locking members 24, 26. Only the resilient forces from the first and second resilient members 42, 48 are available.

Figure 8:
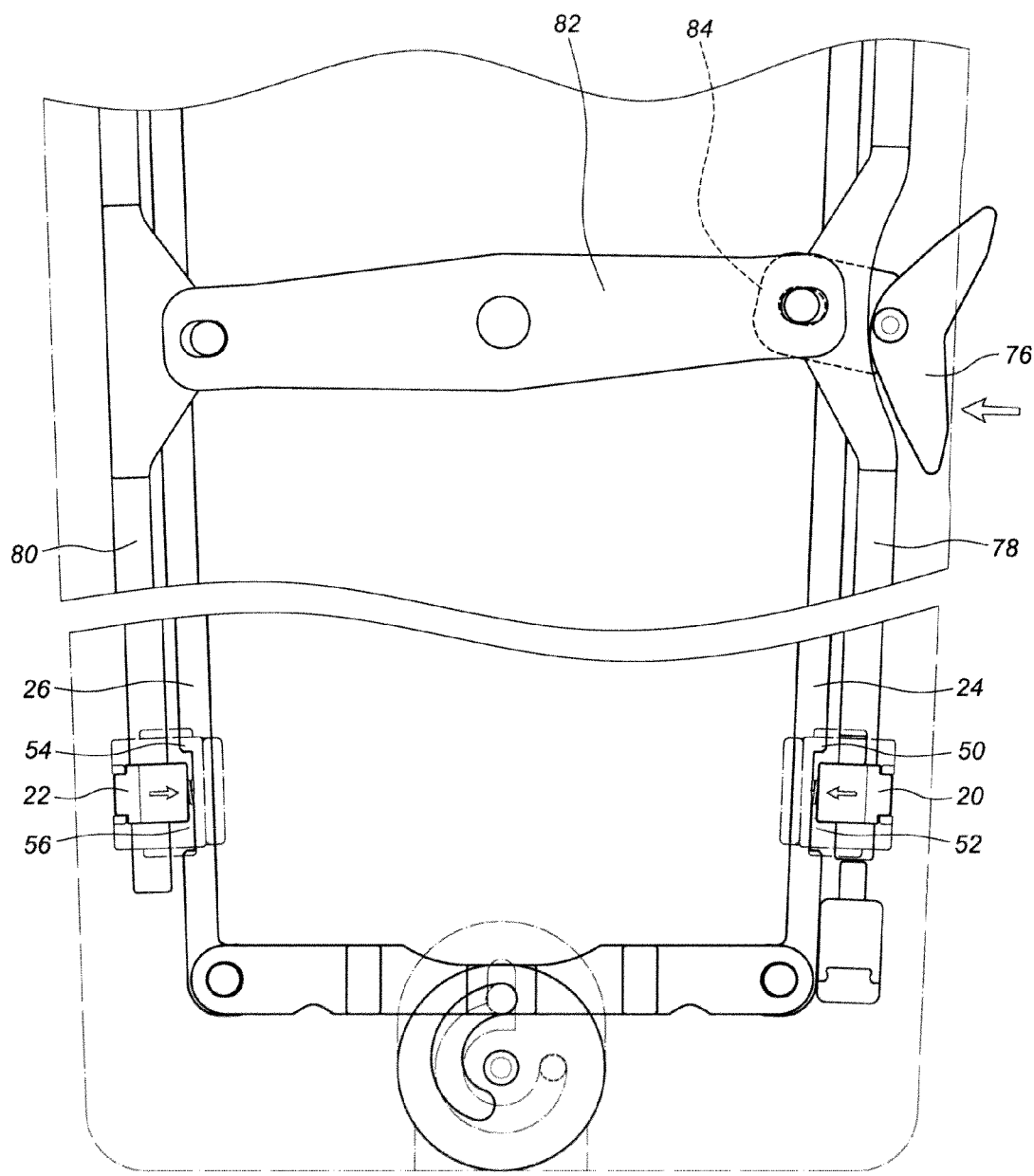
FIG. 8 shows that the locking unit is unlocked and the engaging unit is moved by operation of the control member.

As shown in FIG. 8, when the operation member 76 is operated as a lever, the arm 84 drives both of the first release member 78 and the link 82, and the second release member 80 is driven by the link 82. Therefore, when the operation member is at the unlocked status as shown in FIGS. 7 and 8, the first engaging member 20 is moved by the first release member 78 and moves to the first recess 52 of the first locking member 24. The second engaging member 22 is moved by the second release member 80 and moves to the second recess 56 of the second locking member 26. Accordingly, the first and second engaging members 20, 22 release the body 10 from the case 12 and the case 12 can be removed from the body 10.

Before the securing device is unlocked, the first engaging member 20 is stopped by the first stop 50 of the first locking member 24 and secured to one side of the case 12, and the second engaging member 22 is stopped by the second stop 54 of the second locking member 26 and secured to the other side of the case 12. This ensures that the case 12 is securely connected to the body 10.

While we have shown and described the embodiment in accordance with the present invention, it should be clear to those skilled in the art that further embodiments may be made without departing from the scope of the present invention.

What is claimed is:

1. A securing device comprising:
   a body, a case, an engaging unit and a locking unit, the body having a first side and a second side which is located corresponding to the first side, the case mounted to the body, the engaging unit having at least one first engaging member and at least one second engaging member, the locking unit having a first locking member, a second locking member, a connection member and a control member;
   the at least one first engaging member connected to the first side of the body and the at least one second engaging member connected to the second side of the body;
   the first locking member movably connected to the first side of the body and movable from a first initial position to a first unlocking position relative to the at least one first engaging member, the first locking member having at least one first stop and at least one first recess, the at least one first stop located corresponding to the at least one first engaging member so that the at least one first engaging member is stopped by the at least one first stop when the first locking member is located at the first initial position;
   the second locking member movably connected to the second side of the body and movable from a second initial position to a second unlocking position relative to the at least one second engaging member, the second locking member having at least one second stop and at least one second recess, the at least one second stop located corresponding to the at least one second engaging member so that the at least one second engaging member is stopped by the at least one second stop when the second locking member is located at the second initial position;
   the connection member having a first end, a second end located corresponding to the first end, and a connection portion connected between the first and second ends, the first end and the second end respectively pivotably connected to the first locking member and the second locking member, and
   the control member connected to the connection portion of the connection member, the control member movable from a third initial position to a third unlocking position, the at least one first engaging member located corresponding to the at least one first stop when the control member is located at the third initial position and the first locking member is located at the first initial position, the at least one second engaging member located corresponding to the at least one second stop when the second locking member is located at the second initial position, the connection member being moved by the control member when the control member is moved to the third unlocking position, and the first recess of the first locking member is moved from the first initial position to the first unlocking position and located corresponding to the at least one first engaging member, and the second recess of the second locking member is moved from the second initial position to the second unlocking position and located corresponding to the at least one second engaging member;
   wherein the connection portion of the connection member has at least one slide member and the body has at least one slot which is located corresponding to the at least one slide member, the connection member moves linearly by moving the at least one slide member within the at least one slot.

2. The securing device as claimed in claim 1, wherein the control member has a shaft portion and a guide slot, the shaft portion is pivotably connected to the body and the guide slot is located corresponding to the connection portion of the connection member, the connection portion has a pin engaged with the guide slot.

3. The securing device as claimed in claim 2, wherein the guide slot is shaped as an involute with a center at the shaft portion.

4. The securing device as claimed in claim 2, wherein the control member includes a stop member and the body has a restriction slot located corresponding to the stop member, the restriction slot is an annular slot with a center at the shaft portion.

5. The securing device as claimed in claim 1, wherein the body has a first part and a second part, the first part and the second part are matched to each other to accommodate the engaging unit and the locking unit therein, the engaging unit and the locking unit are composed of the at least one first engaging member, the at least one second engaging member, the first locking member, the second locking member, the connection member and the control member.

6. The securing device as claimed in claim 1, further comprising an operation unit connected to the body, wherein the operation unit includes an operation member, a first release member connected to the operation member, a second release member and a link, the link is pivotably connected to the body at a mediate portion thereof and either end of the link is connected to the first and second release members, respectively, the first release member drives the at least one first engaging member and the second release member drives the at least one second engaging member, the operation member is pivotably connected to the body and has an arm which is connected to an end of the first release member wherein one end of the link is connected to the end of the first release member.

7. The securing device as claimed in claim 6, wherein the operation member has a pivot which pivotably connects the operation member to the body and the arm has a connection hole, the first release member has a protrusion which extends through the connection hole.

8. A securing device comprising:
a body, a case, an engaging unit and a locking unit, the body having a first side and a second side which is located corresponding to the first side, the case mounted to the body, the engaging unit having at least one first engaging member and at least one second engaging member, the locking unit having a first locking member, a second locking member, a connection member and a control member;

the at least one first engaging member connected to the first side of the body and the at least one second engaging member connected to the second side of the body;

the first locking member movably connected to the first side of the body and movable from a first initial position to a first unlocking position relative to the at least one first engaging member, the first locking member having at least one first stop and at least one first recess, the at least one first stop located corresponding to the at least one first engaging member so that the at least one first engaging member is stopped by the at least one first stop when the first locking member is located at the first initial position;

the second locking member movably connected to the second side of the body and movable from a second initial position to a second unlocking position relative to the at least one second engaging member, the second locking member having at least one second stop and at least one second recess, the at least one second stop located corresponding to the at least one second engaging member so that the at least one second engaging member is stopped by the at least one second stop when the second locking member is located at the second initial position;

the connection member having a first end, a second end located corresponding to the first end, and a connection portion connected between the first and second ends, the first end and the second end respectively pivotably connected to the first locking member and the second locking member, and the control member connected to the connection portion of the connection member, the control member movable from a third initial position to a third unlocking position, the at least one first engaging member located corresponding to the at least one first stop when the control member is located at the third initial position and the first locking member is located at the first initial position, the at least one second engaging member located corresponding to the at least one second stop when the second locking member is located at the second initial position, the connection member being moved by the control member when the control member is moved to the third unlocking position, and the first recess of the first locking member is moved from the first initial position to the first unlocking position and located corresponding to the at least one first engaging member, and the second recess of the second locking member is moved from the second initial position to the second unlocking position and located corresponding to the at least one second engaging member;

wherein the control member has a shaft portion and a guide slot, the shaft portion is pivotably connected to the body and the guide slot is located corresponding to the connection portion of the connection member, the connection portion has a pin engaged with the guide slot, and the control member includes a stop member and the body has a restriction slot located corresponding to the stop member, the restriction slot is an annular slot with a center at the shaft portion.

9. The securing device as claimed in claim 8, wherein the guide slot is shaped as an involute with a center at the shaft portion.

10. The securing device as claimed in claim 8, wherein the body has a first part and a second part, the first part and the second part are matched to each other to accommodate the engaging unit and the locking unit therein, the engaging unit and the locking unit are composed of the at least one first engaging member, the at least one second engaging member, the first locking member, the second locking member, the connection member and the control member.

11. The securing device as claimed in claim 8, further comprising an operation unit connected to the body, wherein the operation unit includes an operation member, a first release member connected to the operation member, a second release member and a link, the link is pivotably connected to the body at a mediate portion thereof and either end of the link is connected to the first and second release members, respectively, the first release member drives the at least one first engaging member and the second release member drives the at least one second engaging member, the operation member is pivotably connected to the body and has an arm which is connected to an end of the first release member wherein one end of the link is connected to the end of the first release member.

12. The securing device as claimed in claim 11, wherein the operation member has a pivot which pivotably connects the operation member to the body and the arm has a connection hole, the first release member has a protrusion which extends through the connection hole.

13. A securing device comprising:
a body, a case, an engaging unit, a locking unit, an operation unit connected to the body, the body having a first side and a second side which is located corresponding to the first side, the case mounted to the body, the engaging unit having at least one first engaging member and at least one second engaging member, the locking unit having a first locking member, a second locking member, a connection member and a control member;

the at least one first engaging member connected to the first side of the body and the at least one second engaging member connected to the second side of the body;

the first locking member movably connected to the first side of the body and movable from a first initial position to a first unlocking position relative to the at least one first engaging member, the first locking member having at least one first stop and at least one first recess, the at least one first stop located corresponding to the at least one first engaging member so that the at least one first engaging member is stopped by the at least one first stop when the first locking member is located at the first initial position;

the second locking member movably connected to the second side of the body and movable from a second initial position to a second unlocking position relative to the at least one second engaging member, the second locking member having at least one second stop and at least one second recess, the at least one second stop located corresponding to the at least one second engaging member so that the at least one second engaging member is stopped by the at least one second stop when the second locking member is located at the second initial position;

the connection member having a first end, a second end located corresponding to the first end, and a connection portion connected between the first and second ends, the first end and the second end respectively pivotably connected to the first locking member and the second locking member;

the control member connected to the connection portion of the connection member, the control member movable from a third initial position to a third unlocking position, the at least one first engaging member located corresponding to the at least one first stop when the control member is located at the third initial position and the first locking member is located at the first initial position, the at least one second engaging member located corresponding to the at least one second stop when the second locking member is located at the second initial position, the connection member being moved by the control member when the control member is moved to the third unlocking position, and the first recess of the first locking member is moved from the first initial position to the first unlocking position and located corresponding to the at least one first engaging member, and the second recess of the second locking member is moved from the second initial position to the second unlocking position and located corresponding to the at least one second engaging member; and the operation unit including an operation member, a first release member connected to the operation member, a second release member and a link, the link is pivotably connected to the body at a mediate portion thereof and either end of the link is connected to the first and second release members, respectively, the first release member drives the at least one first engaging member and the second release member drives the at least one second engaging member, the operation member is pivotably connected to the body and has an arm which is connected to an end of the first release member wherein one end of the link is connected to the end of the first release member.

14. The securing device as claimed in claim 13, wherein the control member has a shaft portion and a guide slot, the shaft portion is pivotably connected to the body and the guide slot is located corresponding to the connection portion of the connection member, the connection portion has a pin engaged with the guide slot.

15. The securing device as claimed in claim 14, wherein the guide slot is shaped as an involute with a center at the shaft portion.

16. The securing device as claimed in claim 13, wherein the body has a first part and a second part, the first part and the second part are matched to each other to accommodate the engaging unit and the locking unit therein, the engaging unit and the locking unit are composed of the at least one first engaging member, the at least one second engaging member, the first locking member, the second locking member, the connection member and the control member.

17. The securing device as claimed in claim 13, wherein the operation member has a pivot which pivotably connects the operation member to the body and the arm has a connection hole, the first release member has a protrusion which extends through the connection hole.

\* \* \* \* \*